United States Patent
Petrovic

(10) Patent No.: US 6,427,012 B1
(45) Date of Patent: *Jul. 30, 2002

(54) APPARATUS AND METHOD FOR EMBEDDING AND EXTRACTING INFORMATION IN ANALOG SIGNALS USING REPLICA MODULATION

(75) Inventor: Rade Petrovic, Wilmington, MA (US)

(73) Assignee: Verance Corporation, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/106,213

(22) Filed: Jun. 29, 1998

Related U.S. Application Data

(63) Continuation-in-part of application No. 08/974,920, filed on Nov. 20, 1997, now Pat. No. 6,175,627, and a continuation-in-part of application No. 08/858,562, filed on May 19, 1997, now Pat. No. 5,940,135.

(51) Int. Cl.[7] ............................................. H04N 7/167
(52) U.S. Cl. ..................... 380/238; 380/252; 380/43; 380/31; 713/176; 713/200; 382/191; 382/132
(58) Field of Search ..................... 380/31, 43, 238, 380/252; 713/176, 200; 382/191, 232

(56) References Cited

U.S. PATENT DOCUMENTS

| | | | | |
|---|---|---|---|---|
| 5,613,004 A | * | 3/1997 | Cooperman et al. | 380/28 |
| 5,664,018 A | * | 9/1997 | Leighton | 380/54 |
| 5,822,432 A | * | 10/1998 | Moskowitz et al. | 380/28 |
| 5,825,892 A | * | 10/1998 | Braudaway et al. | 380/51 |
| 5,848,155 A | * | 12/1998 | Cox | 382/191 |
| 5,940,135 A | * | 8/1999 | Petrovic et al. | 348/473 |
| 5,949,885 A | * | 9/1999 | Leighton | 380/54 |
| 6,078,664 A | * | 6/2000 | Moskowitz et al. | 380/28 |
| 6,145,081 A | * | 11/2000 | Winograd et al. | 713/200 |

FOREIGN PATENT DOCUMENTS

| | | |
|---|---|---|
| EP | 0372601 | 6/1990 |
| WO | 9514289 | 5/1995 |
| WO | 9709797 | 3/1997 |
| WO | 9733391 | 9/1997 |
| WO | 9853565 | 11/1998 |
| WO | WO 99/39344 | * 8/1999 |
| WO | WO 00/00969 | * 1/2000 |

* cited by examiner

*Primary Examiner*—Gilberto Barrón
*Assistant Examiner*—Paul E. Callahan
(74) *Attorney, Agent, or Firm*—Rothwell, Figg, Ernst & Manbeck

(57) ABSTRACT

Apparatus and methods are provided for embedding or encoding auxiliary signals into an analog host or cover signal. A replica of the cover signal or a portion of the cover signal in a particular domain (time, frequency or space) is generated according to a stego key specifying modification values to specified parameters of the cover signal. The replica signal is then modified by an auxiliary signal corresponding to the information to be embedded, and inserted back into the cover signal. Embedded auxiliary signals are extracted by generating replicas of received signals and correlating the replicas with the received signals.

27 Claims, 3 Drawing Sheets

APPARATUS AND METHOD FOR EMBEDDING AND EXTRACTING INFORMATION IN ANALOG SIGNALS USING REPLICA MODULATION

CROSS-REFERENCE TO RELATED APPLICATION

This application is a continuation-in-part of application Ser. No. 08/858,562, filed May 19, 1997, now U.S. Pat. No. 5,940,135, and assigned to the same assignee as the present application. This application is also a continuation-in-part of application Ser. No. 08/974,920 filed Nov. 20, 1997, now U.S. Pat. No. 6,175,627, and assigned to the same assignee as the present application.

BACKGROUND OF THE INVENTION

1. Field of the Invention

This invention relates to apparatus and methods for encoding or embedding and decoding or extracting information in analog signals, such as audio, video and data signals, either transmitted by radio wave transmission or wired transmission, or stored in a recording medium such as optical or magnetic disks, magnetic tape, or solid state memory.

2. Background and Description of Related Art

The present invention is concerned with techniques for embedding and extracting auxiliary information within an existing signal, such as an audio or video signal.

An area of particular interest to certain embodiments of the present invention relates to the market for musical recordings. Currently, a large number of people listen to musical recordings on radio or television. They often hear a recording which they like enough to purchase, but don't know the name of the song, the artist performing it, or the record, tape, or CD album of which it is part. As a result, the number of recordings which people purchase is less than it otherwise would be if there was a simple way for people to identify which of the recordings that they hear on the radio or TV they wish to purchase.

Another area of interest to certain embodiments of the invention is copy control (also referred to as digital watermarking). There is currently a large market for audio software products, such as musical recordings. One of the problems in this market is the ease of copying such products without paying those who produce them. This problem is becoming particularly troublesome with the advent of recording techniques, such as digital audio tape (DAT), which make it possible for copies to be of very high quality. Thus it would be desirable to develop a scheme which would prevent the unauthorized copying of audio recordings, including the unauthorized copying of audio works broadcast over the airwaves. It is also desirable for copyright enforcement to be able to insert into program material such as audio or video signals digital copyright information identifying the copyright holder, which information may be detected by appropriate apparatus to identify the copyright owner of the program, while remaining imperceptible to the listener or viewer.

Yet another field of interest relating to the present invention pertains to automatic royalty tracking and proof of performance of copyrighted material or commercial advertisements, by which copyright owners are able to track public performances or broadcasts of their material for royalty payment purposes, and advertisers are able to confirm that commercials which they have paid for were actually broadcast at the proper time and date.

Still another area of interest to the present invention relates to integrity verification or tampering detection, wherein the creator of an audio or audiovisual work can determine whether it has been altered, modified or incorporated into another work.

Various prior art methods of encoding additional information onto a source signal are known. For example, it is known to pulse-width modulate a signal to provide a common or encoded signal carrying at least two information portions or other useful portions. In U.S. Pat. No. 4,497,060 to Yang (1985) binary data is transmitted as a signal having two differing pulse-widths to represent logical "0" and "1" (e.g., the pulse-width durations for a "1" are twice the duration for a "0"). This correspondence also enables the determination of a clocking signal.

With respect to systems in which audio signals produce audio transmissions, U.S. Pat. Nos. 4,876,617 to Best et al. (1989) and 5,113,437 to Best et al. (1992) disclose encoders for forming relatively thin and shallow (e.g., 150 Hz wide and 50 dB deep) notches in mid-range frequencies of an audio signal. The earlier of these patents discloses paired notch filters centered about the 2883 Hz and 3417 Hz frequencies; the later patent discloses notch filters but with randomly varying frequency pairs to discourage erasure or inhibit filtering of the information added to the notches. The encoders then add digital information in the form of signals in the lower frequency indicating a "0" and in the higher frequency a "1". In the later Best et al. patent an encoder samples the audio signal, delays the signal while calculating the signal level, and determines during the delay whether or not to add the data signal and, if so, at what signal level. The later Best et al. patent also notes that the "pseudo-random manner" in moving the notches makes the data signals more difficult to detect audibly.

Other prior art techniques employ the psychoacoustic model of the human perception characteristic to insert modulated or unmodulated tones into a host signal such that they will be masked by existing signal components and thus not perceived. See. e.g. Preuss et al., U.S. Pat. No. 5,319,735, and Jensen et al., U.S. Pat. No. 5,450,490. Such techniques are very expensive and complicated to implement, while suffering from a lack of robustness in the face of signal distortions imposed by perception-based compression schemes designed to eliminate masked signal components.

The prior art fails to provide a method and an apparatus for embedding and extracting auxiliary analog or digital information signals onto analog audio or video frequency signals for producing humanly perceived transmissions (i.e., sounds or images) such that the audio or video frequency signals produce substantially identical humanly perceived transmission prior to as well as after encoding with the auxiliary signals (in other words, the embedded information is transparent to the listener or viewer), which is also robust to a high degree of signal distortions caused by noisy transmission mediums, etc. The prior art also fails to provide relatively simple and inexpensive apparatus and methods for embedding and extracting signals defining auxiliary information into audio or video frequency signals for producing humanly perceived audio transmissions.

SUMMARY OF THE INVENTION

The present invention provides apparatus and methods for embedding or encoding, and extracting or decoding, auxiliary (analog or digital) information in an analog host or cover signal in a way which has minimal impact on the perception of the source information when the analog signal is applied to an appropriate output device, such as a speaker, a display monitor, or other electrical/electronic device.

The present invention further provides apparatus and methods for embedding and extracting machine readable signals in an analog cover signal which control the ability of a device to copy the cover signal.

In summary, the present invention provides for the encoding or embedding of an auxiliary signal in an analog host or cover signal, by generating a replica signal from the cover signal, modifying the replica signal as a function of the auxiliary signal, and inserting the modified replica signal back into the analog cover signal to provide a stego signal. The invention further provides for the extraction of embedded auxiliary signals from stego signals by generating a replica of the stego signal, and correlating the replica with the stego signal.

According to another aspect of the invention, apparatus for embedding and extracting auxiliary signals in an analog cover signal, is provided, comprising a replica generator for generating a replica signal from the cover signal, a modulator for modifying the replica signal as a function of the auxiliary signal, an adder for inserting the modified replica signal back into the analog cover signal to produce a stego signal, a receiver for receiving the stego signal, a generator for generating a replica signal from the stego signal, a modulator for modifying the received stego signal as a function of the replica signal of the received stego signal, and an extractor for extracting the auxiliary signal by filtering the modified received stego signal.

The term cover signal as used hereinafter refers to a host or source signal, such as an audio, video or other information signal, which carries or is intended to carry embedded or hidden auxiliary data.

BRIEF DESCRIPTION OF THE DRAWINGS

These and other aspects of the present invention will become more fully understood from the following detailed description of the preferred embodiments in conjunction with the accompanying drawings, in which.

DETAILED DESCRIPTION OF THE PREFERRED EMBODIMENTS

The present invention is directed to a method and apparatus for embedding information or data onto a cover signal, such as an audio signal, video signal, or other analog signal (hereinafter called a "cover signal"), by generating a replica of the cover signal within a predefined frequency, time and/or space domain, modulating the replica with an auxiliary signal representing the information to be added to the cover signal, and then inserting the modulated replica back into the cover signal. The invention can implemented in a number of different ways, either by software programming of a digital processor, in the form of analog, digital, or mixed-signal integrated circuits, as a discrete component electronic device, or a combination of such implementations. The replica is similar to the cover signal in time and frequency domain content, but different in certain parameters as specified by a stego key, which is not generally known, but which is known at authorized receiving apparatus.

Figure 1:
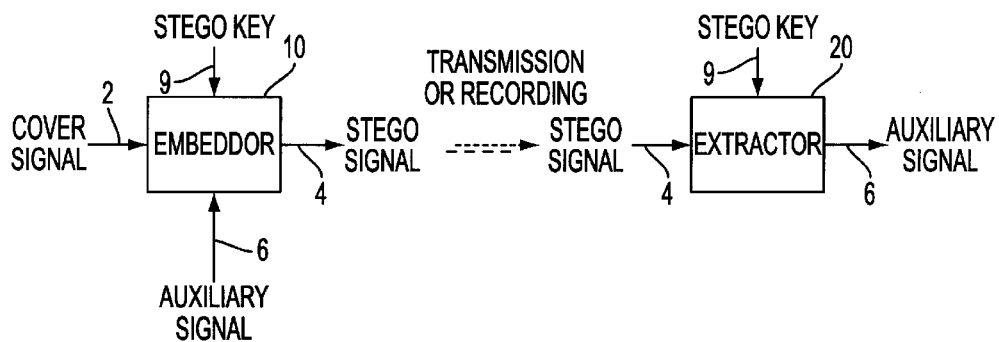
FIG. 1 is a block diagram of a data signal embedding and extracting process utilized by the present invention.

Referring to FIG. 1, the invention employs an embeddor 10 to generate a stego signal 4, which is substantially the same in terms of the content and quality of information carried by a cover signal 2. For instance, where cover signal 2 is a video or audio signal, the stego signal 4 will produce essentially the same video or audio program or information when applied to an output device such as a video display or loudspeaker.

A stego key 9 is used to determine and specify the particular region of the time, frequency and/or space domain of the replica where the auxiliary signal 6 is to be embedded, as well as the parameters of the embedding process.

The embeddor then appropriately modulates or modifies the replica and adds the replica back into the cover signal to obtain a stego signal 4. Stego signal 4 can be transmitted, or stored in a storage medium such as magnetic tape, CD-ROM, solid state memory, and the like for later recall and/or transmission. The embedded auxiliary signal is recovered by an extractor 20, having knowledge of or access to the stego key 9, which operates on the stego signal 4 to extract the auxiliary signal 6. The embedding process can be expressed by the formula:

$$\bar{s}(t) = s(t) + \sum_i w_i(t) \tag{1}$$

where $\bar{s}(t)$ represents the stego signal 4, s(t) represents the cover signal 2, and $w_i(t)$ is the i-th hidden signal 8 (see FIG. 2), also known as a watermark. In this regard, the embeddor can be used to insert multiple auxiliary signals 6 simultaneously, using a different stego key 9 for each signal. In the case where only a single auxiliary signal 6 is to be inserted, a single stego key 9 is used, and there would be only one hidden signal w(t). In equation (1) and hereinafter, a one-dimensional signal (i.e. a signal varying according to a single dimension, such as time) is considered for purposes of simplicity in explanation; however, the present invention is not limited to one-dimensional signals but can be readily extended to multidimensional signals such as images (two dimensions), video (three dimensions), etc., by defining t as a vector.

According to the present invention, a replica of the cover signal 2 itself is used as a carrier for the auxiliary signal 6. Because the replica is inherently similar to the cover signal in terms of frequency content, no analysis of the cover signal is necessary in order to hide an auxiliary signal, such as a digital watermark.

In contrast, according to the prior art techniques discussed above, auxiliary signals are embedded in the form of a pseudorandom sequence (Preuss et al.) or in the form of multiple tones distributed over the frequency band of the cover signal (Jensen et al.). In order to "hide" such signals so that they are perceptively transparent, it was necessary to perform an analysis of the cover signal in the frequency domain to make the watermark signal imperceptible to the observer. Such analysis is based on the phenomenon that human perception will not detect a smaller signal in the presence of a larger signal if the two signals are sufficiently similar. This phenomenon is usually known as the masking effect.

The embedded signal 8 according to the present invention can be expressed by the formula:

$$w_i(t) = g_i m_i(t) r_i(t) \qquad (2)$$

where $g_i < 1$ is a gain (scaling factor) parameter determined by tradeoff considerations of robustness versus transparency, $m_i(t)$ is the auxiliary signal 6, wherein $|m_i(t)| \geq 1$, and $r_i(t)$ is a replica of the cover signal 2. The gain factor $g_i$ can be a predetermined constant for a given application, or it can be adaptable, such that dynamic changes in transparency and robustness conditions can be taken into account. For example, in highly tonal musical passages the gains can be lower, while for spectrally rich or noisy audio signals the gains can be higher, with equivalent levels of transparency. In an alternate embodiment, the embeddor can perform an extractor process simulation to identify signals having less than desirable detectability, and increase the gain accordingly.

Figure 2:
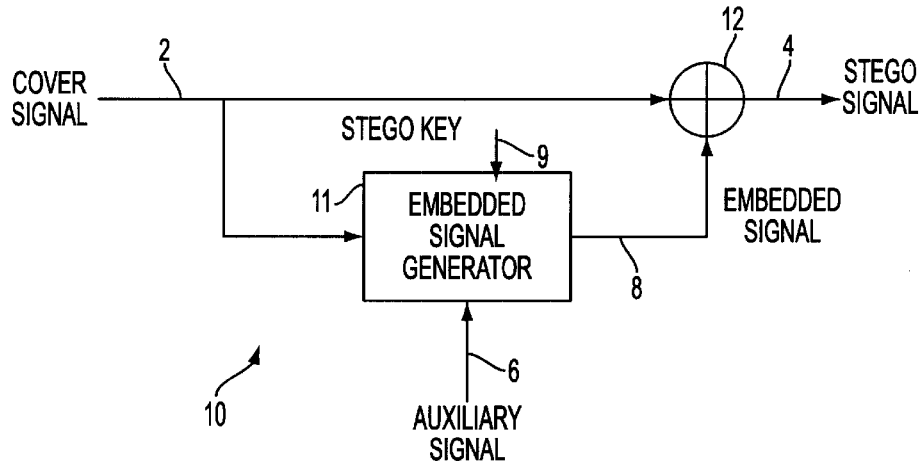
FIG. 2 is a block diagram of one embodiment of the embeddor 10 of FIG. 1.

FIG. 2 shows a block diagram of one preferred embodiment of the embeddor 10. As shown, the cover signal 2, stego key 9, and auxiliary signal 6 are inputted to an embedded signal generator 11. The embedded signal generator generates replica $r_i(t)$ from cover signal 2 according to the stego key 9, modulates or modifies the replica $r_i(t)$ with auxiliary signal 6 ($m_i(t)$), scales the result using gain parameter $g_i$, and generates an embedded signal 8 ($w_i(t)$). The embedded signal 8 is then added to the cover signal 2 (s(t)) in an adder 12, to produce the stego signal 4 ($\bar{s}(t)$).

The replica $r_i(t)$ is obtained by taking a portion of the cover signal 2 within a specified time, frequency and/or spatial domain as specified by the stego key 9, and then making slight modifications to the signal portion, also as specified by the stego key 9. The modifications to the signal portion need to be small to ensure that the replica remains similar to the cover signal as judged by the human psychoacoustic-psychovisual systems, but such modifications must be large enough to be detectable by an appropriately designed extractor having knowledge of or access to the stego key 9. As will be discussed below, a number of different types of modifications have been found to satisfy these requirements.

Equation (2) reveals that the replica $r_i(t)$ is modulated by the auxiliary signal $m_i(t)$ according to a process known as product modulation. Product modulation results in a broadening of the spectrum of the embedded signal proportionally to the spectral width of the auxiliary signal. In order to make the spectrum of the embedded signal similar to the spectrum of the cover signal (to preserve the transparency of the embedding process) the spectrum of the auxiliary signal must be narrow in comparison with the lowest frequency in the spectrum of the replica. This requirement imposes a limit on the capacity of the auxiliary channel, and dictates that low frequency components of the cover signal are unsuitable for inclusion in the creation of the replica.

In a preferred embodiment of the invention, the modulating signal (auxiliary signal) m(t) is a binary data signal defined by the formula:

$$m(t) = \sum_{n=1}^{N} b_n h(t - nT) \qquad (3)$$

where N is the number of binary digits or bits in the message, $b_n \in (-1, 1)$ is the n-th bit value, T is the bit interval, and h(t) represents the shape of the pulse representing the bit. Typically, h(t) is obtained by low-pass filtering a rectangular pulse so as to restrict the spectral width of the modulating (auxiliary) signal.

Figure 3:
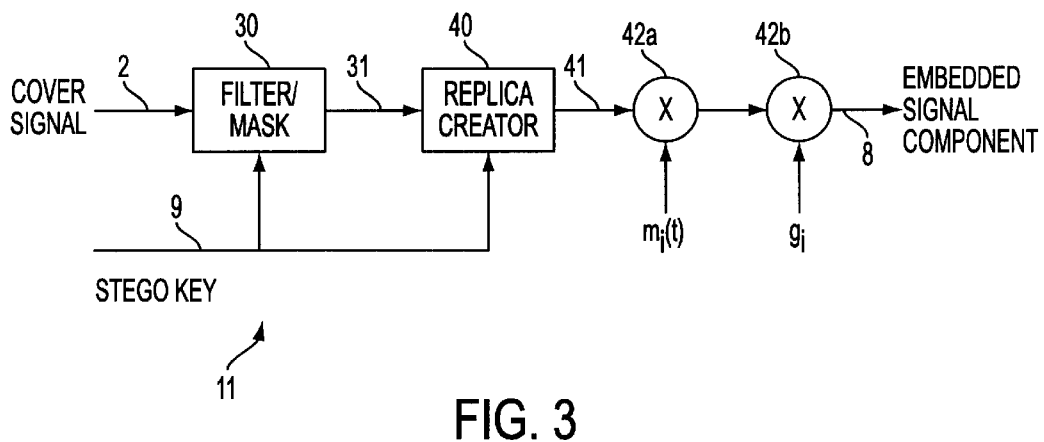
FIG. 3 is a block diagram of one embodiment of the embedded signal generator 11 of FIG. 2.

FIG. 3 illustrates the details of an embedded signal generator 11 used to generate a single embedded data message. The cover signal 2 is filtered and/or masked in filtering/masking block 30 to produce a filtered/masked signal 31. The filter/mask block 30 separates regions of the cover signal used for different embedded messages. For example, the filter/mask block may separate the frequency band region 1000–3000 Hz from the cover signal in the frequency domain, may separate the time interval region t=10 seconds to t=30 seconds from the cover signal in the time domain, or may separate the upper right spatial quadrant region of the cover signal in the spatial domain (such as where the cover signal is an MPEG, JPEG or equivalent signal) which separated region would then be used for auxiliary signal embedding.

The filtered/masked signal 31 is comprised of the selected regions of the cover signal, as specified by stego key 9, which are then used for creation of the replica signal 41. The signal 31 is then inputted to a replica creator 40, where predetermined parameters of the signal are modified, as specified by stego key 9, to create the replica $r_i(t)$ 41. The replica 41 is then modulated by the auxiliary signal $m_i(t)$ in multiplier 42a, and the resultant signal is then scaled in multiplier 42b according to the selected gain factor $g_i$ to produce embedded signal component 8 (i.e., $w_i(t)$ in equation (2)). The embedded signal component 8 is then added back to the cover signal 2 in adder 12 (FIG. 2) to obtain the stego signal 4. In order to maintain synchronization between the cover signal 2 and the embedded signal component 8, inherent processing delays present in the filter/mask block 30 and replica creator block 40 are compensated for by adding equivalent an delay in the cover signal circuit path (between the cover signal input and the adder 12) shown in FIG. 2.

It is further possible to embed multiple auxiliary data signals in the cover signal 2, by using multiple embedded signal generators, each using a different stego key to modify a different feature of the cover signal and/or to use different regions of the cover signal, so as to produce multiple embedded signal components each of which are added to the cover signal 2. Alternatively, the different data signals may be embedded in a cascade fashion, with the output of one embeddor becoming the input of another embeddor using a different stego key. In either alternative interference between embedded signal components must be minimized. This can be accomplished by using non-overlapping frequency, time or space regions of the signal, or by selecting appropriate replica creation parameters, as disclosed below.

Figure 4:
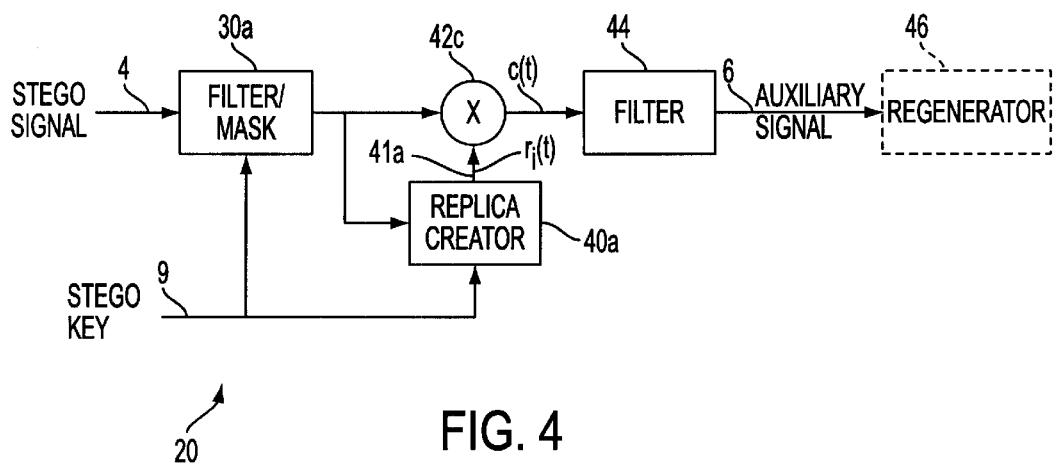
FIG. 4 is a block diagram of one embodiment of the data signal extractor 20 according to the present invention.

A block diagram of an extractor used to recover the auxiliary data embedded in the stego signal is shown in FIG. 4. The stego signal 4 is filtered/masked in filter/mask module 30a to isolate the regions where the auxiliary data is embedded. The filtered signal 31a is inputted to replica creator 40a where a replica $\bar{r}_i(t)$ 41a of the stego signal is generated in the same manner as the replica $\bar{r}_i(t)$ of the cover signal in the replica creator block 40 in the embeddor, using the same stego key 9. The replica $r_i(t)$ of the stego signal 4 can be expressed by the formula:

$$\bar{r}_i(t) = r_i(t) + \sum_i g_i R(m_i(t) r_i(t)) \approx r_i(t) \quad (4)$$

where $R(m_i(t)r_i(t))$ represents the replica of the modulated cover signal replica. For sufficiently small gain factors $g_i$ the replica of the stego signal is substantially the same as the replica of the cover signal.

In the extractor 20, the replica $\bar{r}_i(t)$ 41a is multiplied by the stego signal 31a in multiplier 42c to obtain the correlation product:

$$c(t) = \bar{r}_i(t)\bar{s}(t) \approx r_j(t)s(t) + \Sigma g_j m_i(t) r_i(t) r_j(t) \quad (5)$$

In designing the replica signal, one objective is to obtain spectra of the products $r_j(t)s(t)$ and $r_i(t)r_j(t)$, $i \neq j$, with little low frequency content. On the other hand, the spectra of the product $r_j(t)r_j(t) = r_j^2(t)$ contains a strong DC component, and thus the correlation product $c(t)$ contains a term of the form $g_i m_i(t) \text{mean}(r_j^2)$, i.e., $c(t)$ contains the scaled auxiliary signal $m_i(t)$ as a summation term.

In order to extract the auxiliary signal $m_i(t)$ from the correlation product $c(t)$, filtering is performed on $c(t)$ by filter 44, which has a filter characteristic matching the spectrum of the auxiliary signal. For example, in the case of a binary data signal with a rectangular pulse shape, the matched filtering corresponds to integration over the bit interval. In the case of digital signaling, the filtering operation is followed by symbol regeneration in a regenerator 46. A multiplicity of the extracted data symbols is then subjected to well-known error detection, error correction, and synchronization techniques to verify the existence of an actual message and proper interpretation of the content of the message.

Figure 5:
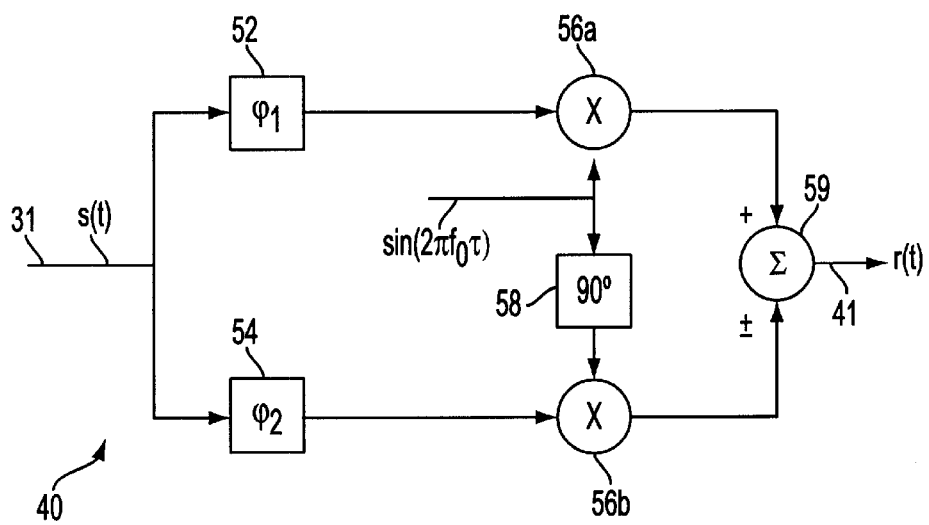
FIG. 5 is a block diagram of one embodiment of a replica generator which produces a cover signal replica shifted in frequency from the original.

One preferred embodiment of a replica creator 40 is shown in FIG. 5. In this embodiment, a replica signal 41 is obtained by shifting the frequency of the filtered cover signal 31 by a predetermined offset frequency $f_i$ as specified by the stego key 9. This shifting process is also known as single sideband amplitude modulation, or frequency translation. In addition to the processing shown in FIG. 5, a number of different techniques known in the art are available to perform this process.

Blocks 52 and 54 represent respective phase shifts of the input signal s(t). To achieve the desired frequency shift, the relationship between the phase shifts must be defined as:

$$\phi_1(f) - \phi_2(f) = 90° \quad (6)$$

The respective phase-shifted signals are multiplied by sinusoidal signals with frequency $f_i$ in respective multipliers 56a and 56b. Block 58 denotes a 90° phase shift of the sinusoidal signal applied to multiplier 56b. The resulting signals are then combined in summer 59.

Thus, the replica signal 41 can be expressed as:

$$r_i(t) = s(t, \phi_1) \sin(2\pi f_i t) \pm s(t, \phi_2) \cos(2\pi f_i t) \quad (7)$$

where $s(t, \phi_i)$ denotes signal s(t) phase-shifted by $\phi_i$. The sign − or + in the summation process represents a respective shift up or down by $f_i$. According to psychoacoustic models published in the literature, better masking may be achieved when the shift is upward. Accordingly, in the preferred embodiment subtraction is used in equation (7). In a special case $\phi_1 = 90°$ and $\phi_2 = 0°$, such that equation (7) becomes:

$$r_i(t) = s_h(t) \sin(2\pi f_i t) \pm s(t) \cos(2\pi f_i t) \quad (8)$$

where $s_h(t)$ is a Hilbert transform of the input signal, defined by:

$$s_h(t) = 1/\pi \int_{-\infty}^{\infty} \frac{s(x)}{t - x} dx \quad (9)$$

The Hilbert transform may be performed in software by various known algorithms, with equation (8) being suitable for digital signal processing. For analog signal processing, it is easier to design a circuit pair that maintains the 90° relative phase shifts throughout the signal spectrum, than to perform a Hilbert transform.

The particular frequency offset $f_i$ can be chosen from a wide range of frequencies, and specified by the stego key. Multiple auxiliary signals can be inserted into the same time, frequency and/or space domain of the same cover signal, by having a different frequency offset value, to thus achieve a "layering" of auxiliary signals and increase auxiliary channel throughput.

The frequency offset also may be varied in time according to a predefined secret pattern (known as "frequency hopping"), to improve the security of a digital watermark represented by the auxiliary information.

The particular choice of frequency offset values is dependent upon the conditions and parameters of the particular application, and can be further fine tuned by trial and error. According to experimental results, optimal signal robustness in the presence of channel distortion was achieved where the frequency offset value was larger than the majority of spectrum frequencies of the modulating auxiliary signal m(t). On the other hand, optimal transparency was achieved where the frequency offset value was substantially smaller than the lowest frequency of the cover signal. As an example, for audio signal embedding a cover signal above 500 Hz was used with a frequency offset of 50 Hz, while the modulating signal was a binary data signal with a bit rate of 25 bps.

In an alternative embodiment of a replica creator, the replica is generated by shifting the phase of the filtered/masked portion 31 of the cover signal by a predetermined amount defined by a function $\phi_i(f)$ for an i-th embedded signal. In this case, the replica generators 40 and 40a are linear systems having a transfer function defined as:

$$H_i(f) = A_i e^{j\phi_i(f)} \quad (10)$$

Where $A_i$ is a constant with respect to frequency, j is the imaginary number $\sqrt{-1}$, and $\phi_i(f)$ is the phase characteristic of the system. Circuits described by equation (10) are known in the art as all-pass filters or phase correctors, and their design is well-known to those skilled in the art.

This embodiment is particularly suitable for auxiliary signal embedding in audio signals, since the human audio sensory system is substantially insensitive to phase shifts. The functions $\phi_i(f)$ are defined to meet the objective that the product of the replica and the cover signal contain minimal low frequency content. This can be achieved by maintaining at least a 90° shift for all frequency components in the filtered/masked signal 31. Multiple embedded messages have been implemented with little interference where the phase shift between frequency components of different messages is larger than 90° for the majority of the spectral components. The exact choice of the function $\phi_i(f)$ is otherwise governed by considerations of tradeoff between cost and security. In other words, the function should be complex enough so that it is difficult for unauthorized persons to determine the signal structure by analyzing the stego signal, even with the known cover signal, yet it should be computationally inexpensive to implement. A function hopping pattern which switches between different functions at predetermined intervals as part of the stego key can be used to further enhance security.

A special class of phase shift functions, defined by $$\phi_i(f) = \tau_i f \tag{11}$$

where $\tau_i$ is a constant, results in time shift replicas of the cover signal. This class of functions has special properties in terms of cost/security tradeoff, which are beyond the scope of the present disclosure and will not be further treated here.

Figures 6A, 6B, 6C:
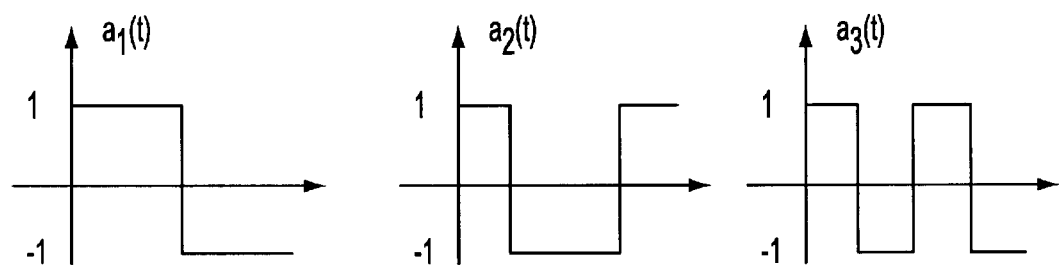
FIGS. 6(a)–6(c) are graphs showing a set of orthogonal functions used in the creation of an amplitude-shifted replica according to one embodiment of the present invention.

According to a further alternate embodiment of the invention, the replica generator obtains the replica signal by amplitude modulation of the cover signal. The amplitude modulation can be expressed by the equation $$r_i(t) = a_i(t)s(t) \tag{12}$$

where $a_i(t)$ is a class of orthogonal functions. FIGS. 6(a)–6(c) illustrate a set of three elementary functions $a_1(t)$, $a_2(t)$, and $a_3(t)$ used to generate amplitude shifted replica signals, with each function being defined over the interval (0,T) where T equals the bit interval of the auxiliary signal. Longer replicas are generated by using a string of elementary functions. Post-correlation filtering in the extractor is performed by integration over the interval T, and the auxiliary channel bit $b_{j,n}$ is extracted according to the formula $\bar{b}_{j,n} = \text{sign}(A_{j,n})$, where:

$$A_{j,n} = \int_{(n-1)T}^{nT} c(t) dt \approx \int_{(n-1)T}^{nT} a_j(t) s^2(t) dt + \tag{13}$$

$$\sum_i g_i \int_{(n-1)T}^{nT} m_i(t) s^2(t) a_i(t) a_j(t) dt \approx g_j \int_{(n-1)T}^{nT} m_j(t) s^2(t) dt$$

The above approximations hold, since $$\int_0^T a_j(t) dt = 0, \quad \int_0^T a_i(t) a_j(t) dt = 0, \quad \text{for } i \neq j, \quad \text{and } a_j^2(t) = 1$$

As is apparent from equation (13), the sign of $A_{j,n}$ (and the received bit value) depends on the sign of $m_j(t)$ during the n-th bit interval, or in other words the transmitted bit value. The functions used for amplitude shifting generally should have a small low frequency content, a spectrum below the lowest frequency of the filtered/masked signal, and should be mutually orthogonal. The particular choice of functions depends upon the specific application, and is specified in the stego key.

According to yet another alternative embodiment, a combination of different shifts in different domains can be executed simultaneously to generate a replica signal. For example, a time shift can be combined with a frequency shift, or an amplitude shift can be combined with a phase shift. Such a combination shift can further improve the hiding (security) property of the embedding system, and also improve detectability of the embedded signal by increasing the difference from the cover signal.

With respect to security, attacks would be expected that incorporate analysis designed to reveal the parameters of the stego key. If such parameters become known, then the embedded signal can be overwritten or obliterated by use of the same stego key. Use of a combination of shifts makes such analysis more difficult by enlarging the parameter space.

With respect to detectability, certain naturally occurring signals may have a content similar to a replica signal; for example, echo in an audio signal may produce a phase shifted signal, choral passages in a musical program may produce a frequency shifted signal, and tremolo may produce amplitude shifts, which may interfere with embedded signal detection. Use of a combination of shifts reduces the likelihood that a natural phenomenon will exactly match the parameters of the stego key, and interfere with signal detection.

The invention having been thus described, it will be apparent to those skilled in the art that the same may be varied in many ways without departing from the spirit and scope of the invention. Any and all such modifications as would be apparent to those skilled in the art are intended to be covered by the following claims.

What is claimed is:

1. A method for embedding an auxiliary signal in an analog cover signal, comprising the steps of:
    generating a replica signal from said cover signal by modifying at least a portion of said cover signal in a predetermined domain according to a stego key;
    modifying said replica signal as a function of said auxiliary signal; and
    inserting the modified replica signal back into said analog cover signal.

2. A method according to claim 1, wherein said predetermined domain is the frequency domain.

3. A method according to claim 1, wherein said predetermined domain is the time domain.

4. A method according to claim 1, wherein said predetermined domain is the spatial domain.

5. A method according to claim 1, wherein said replica signal is obtained by shifting the frequency of said at least one portion of said cover signal by a predefined amount specified by said stego keys.

6. A method according to claim 1, wherein said replica signal is obtained by shifting the phase of said at least one portion of said cover signal by a predefined amount specified by said stego key.

7. A method according to claim 1, wherein said replica signal is obtained by shifting the amplitude of said at least one portion of said cover signal by a predefined amount specified by said stego key.

8. A method according to claim 1, wherein said replica signal is obtaining by shifting a predetermined combination of the frequency, phase, and/or amplitude of said at least one portion of said cover signal by predefined amounts specified by said stego key.

9. A method according to claim 1, wherein the step of modifying comprises the step of multiplying said replica signal with said auxiliary signal.

10. A method for extracting an embedded auxiliary signal from an analog stego signal, comprising the steps of:
    generating a replica signal from said stego signal by modifying at least a portion of said stego signal in a predetermined domain according to a stego key;
    modifying said stego signal as a function of said replica signal; and
    extracting said embedded auxiliary signal by filtering said modified stego signal.

11. A method according to claim 10, wherein said predetermined domain is the frequency domain.

12. A method according to claim 10, wherein said predetermined domain is the time domain.

13. A method according to claim 10, wherein said predetermined domain is the spatial domain.

14. A method according to claim 10, wherein said replica signal is obtained by shifting the frequency of said at least one portion of said stego signal by a predefined amount specified by said stego key.

15. A method according to claim 10, wherein said replica signal is obtained by shifting the phase of said at least one portion of said stego signal by a predefined amount specified by said stego key.

16. A method according to claim 10, wherein said replica signal is obtained by shifting the amplitude of said at least one portion of said stego signal by a predefined amount specified by said stego key.

17. A method according to claim 10, wherein said replica signal is obtained by shifting a predetermined combination of the frequency, phase and/or amplitude of said at least one portion of said stego signal by a predefined amount specified by said stego key.

18. A method according to claim 10, wherein the step of modifying comprises the step of multiplying said replica signal with said stego signal.

19. Apparatus for embedding and extracting auxiliary signals in an analog cover signal, comprising:

means for generating a replica signal from said cover signal, by modifying at least a portion of said cover signal in a predetermined domain according to a stego key;

means for modifying said replica signal as a function of said auxiliary signal;

means inserting the modified replica signal back into said analog cover signal to produce a stego signal;

means for receiving said stego signal;

means for generating a replica signal from said stego signal;

means for modifying said received stego signal as a function of said replica signal of said received stego signal; and means for extracting said auxiliary signal by filtering said modified received stego signal.

20. Apparatus according to claim 19, wherein said predetermined domain is the frequency domain.

21. Apparatus according to claim 19, wherein said predetermined domain is the time domain.

22. Apparatus according to claim 19, wherein said predetermined domain is the spatial domain.

23. Apparatus according to claim 19, wherein said replica signal is obtained by shifting the frequency of said at least one portion of said cover signal by a predefined amount specified by said stego key.

24. Apparatus according to claim 19, wherein said replica signal is obtained by shifting the phase of said at least one portion of said cover signal by a predefined amount specified by said stego key.

25. Apparatus according to claim 19, wherein said replica signal is obtained by shifting the amplitude of said at least one portion of said cover signal by a predefined amount specified by said stego key.

26. Apparatus according to claim 19, wherein said replica signal is obtaining by shifting a predetermined combination of the frequency, phase, and/or amplitude of said at least one portion of said cover signal by predefined amounts specified by said stego key.

27. Apparatus according to claim 19, wherein said means for modifying said replica signal comprises means for multiplying said replica signal with said auxiliary signal.

\* \* \* \* \*